UNITED STATES PATENT OFFICE.

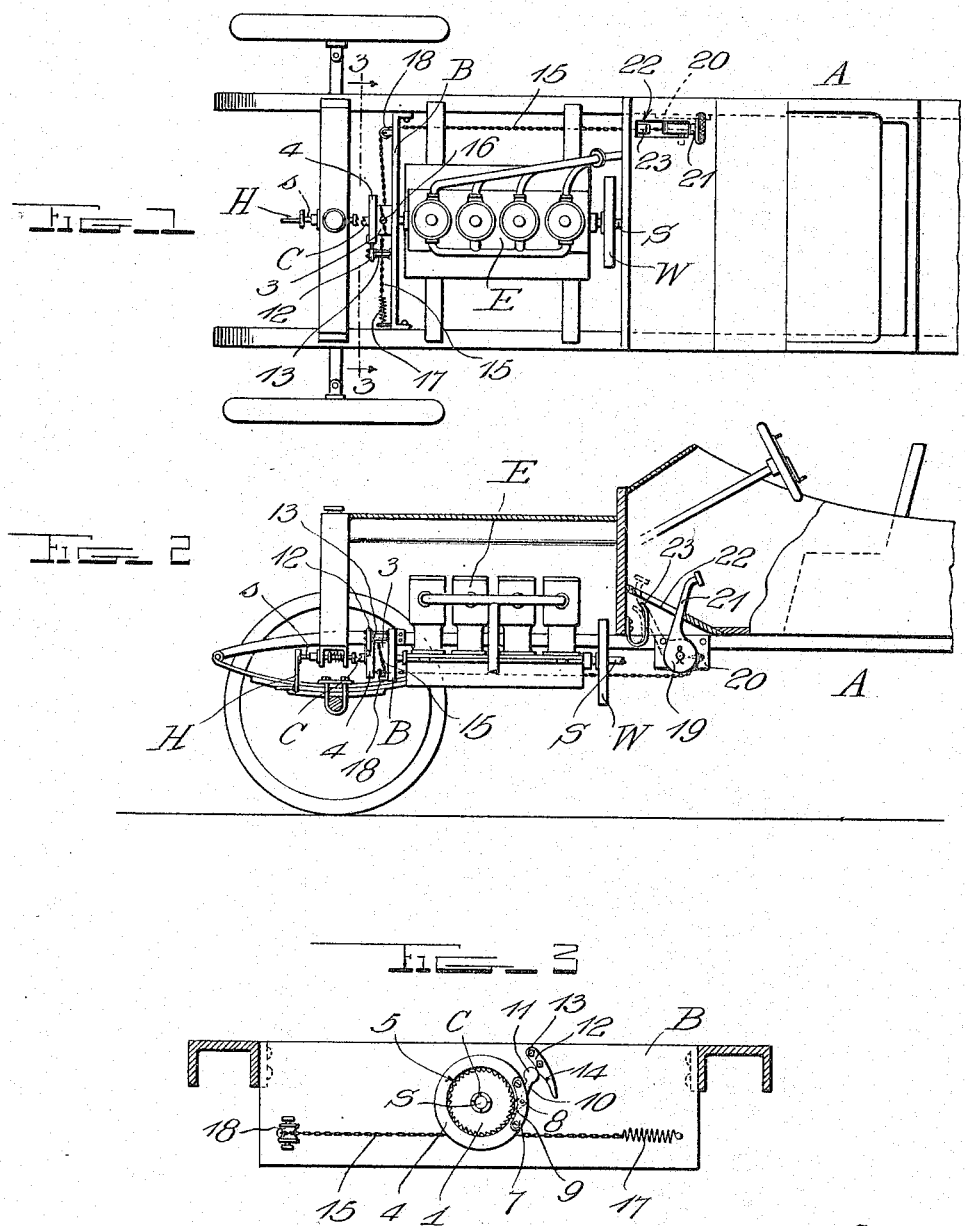

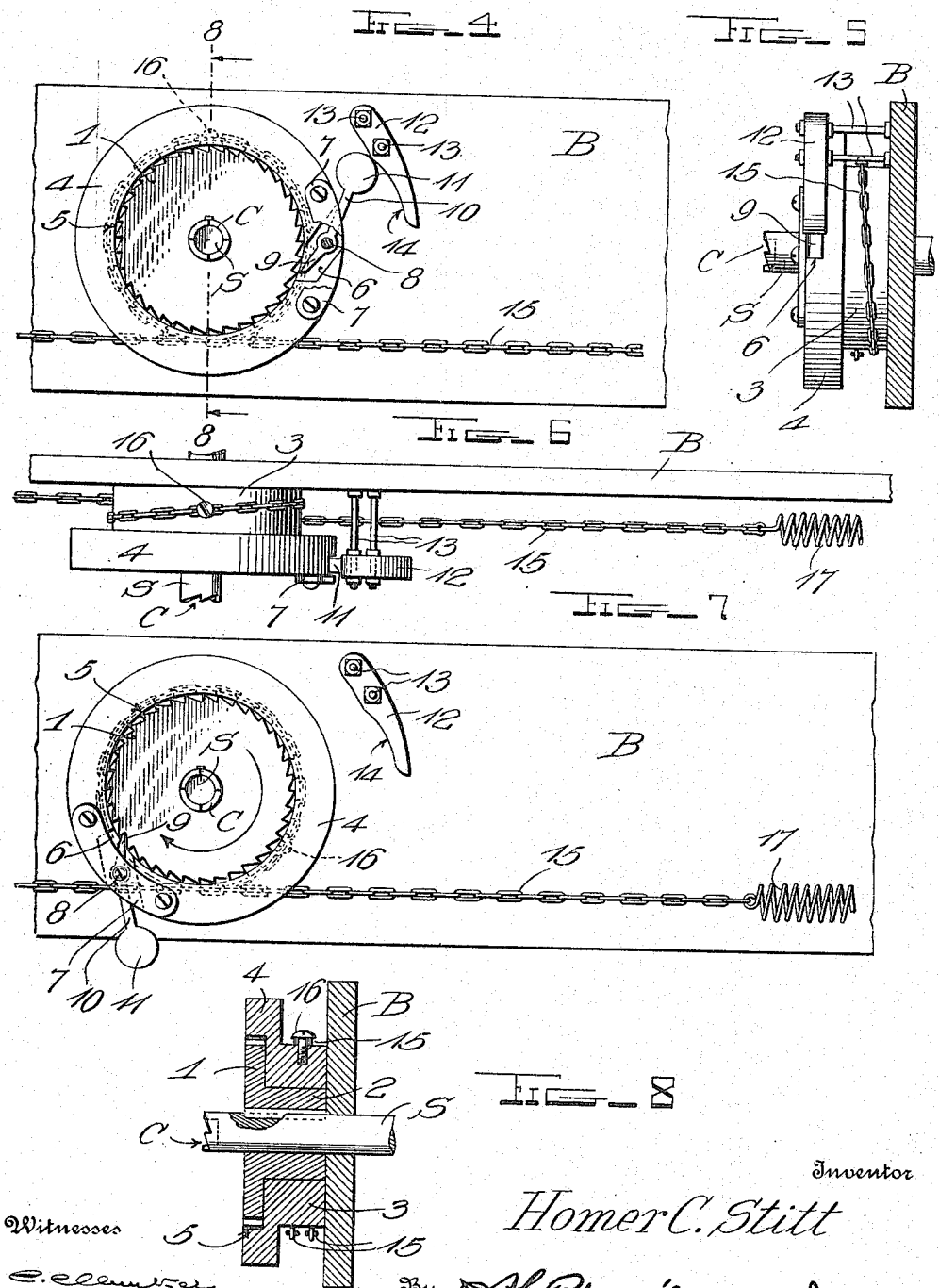

HOMER C. STITT, OF PATTONSBURG, MISSOURI.

CRANKING DEVICE FOR MOTOR-VEHICLES.

1,129,026. Specification of Letters Patent. Patented Feb. 16, 1915.

Application filed April 3, 1913. Serial No. 758,639.

*To all whom it may concern:*

Be it known that I, HOMER C. STITT, a citizen of the United States, residing at Pattonsburg, in the county of Daviess and State of Missouri, have invented certain new and useful Improvements in Cranking Devices for Motor-Vehicles; and I do declare the following to be a full, clear, and exact description of the invention, such as will enable others skilled in the art to which it appertains to make and use the same.

This invention relates to improvements in cranking devices for vehicles.

One object of the invention is to provide a cranking device whereby the engine of the motor vehicle may be started from the seat thereof.

Another object is to provide a cranking device of this character which will be simple, strong, durable and inexpensive in construction, efficient and reliable in operation and which will not interfere with the use of the regular cranking mechanism of the engine.

With these and other objects in view, the invention consists of certain novel features of construction, and the combination and arrangement of parts as will be more fully described and claimed.

In the accompanying drawings: Figure 1 is a plan view of a portion of the front end of an automobile with the engine casing or hood removed and illustrating the application of the invention; Fig. 2 is a central vertical section thereof; Fig. 3 is an enlarged detail cross section through the side bars of the motor frame showing a front end view of my improved cranking mechanism and taken on the line 3—3 of Fig. 1. Fig. 4 is an enlarged front view of the clutching device of the starting mechanism with the parts in inoperative position; Fig. 5 is a side view thereof; Fig. 6 is a top plan view of the same; Fig. 7 is a view similar to Fig. 4 showing the parts of the clutch device in operative position for revolving the crank shaft; Fig. 8 is a vertical longitudinal sectional view of the clutch mechanism taken on the line 8—8 of Fig. 4.

Referring more particularly to the drawings, A denotes a portion of the body of an automobile in the forward end of which is arranged the engine or motor E, the shaft S of which projects forwardly and is revolubly engaged with a cross bar B forming part of the automobile frame. On the shaft near the inner end of the engine is mounted the usual fly wheel W, while on the outer end of the shaft is arranged one member of the hand cranking clutch C the other member of which is fixed on the inner end of a short hand cranking shaft $s$ mounted in the front end of the frame and which is provided with the usual cranking handle H whereby the engine shaft may be cranked by hand in the usual manner.

The foregoing parts may be of any approved construction and do not form part of the present invention.

My improved cranking mechanism comprises a ratchet gear 1 which is keyed or otherwise fixedly mounted on the drive shaft S adjacent to the forward end thereof and to the front side of the cross bar B. The ratchet gear 1 is provided with a rearwardly extending cylindrical hub 2 on which is revolubly mounted a clutch device comprising a sleeve 3 having on its outer end a radially projecting flange 4 which extends beyond the end of the sleeve and forms a circular seat 5 the diameter of which corresponds to the diameter of the ratchet gear 1 which is seated therein as clearly shown in Fig. 8 of the drawings.

At a suitable position in the flange 4 is formed a recess 6 which extends through its outer and its inner edges and is arranged tangentially to the teeth of the ratchet gear 1 and the open side thereof is covered by a segmental plate 7 secured to the outer side of the flange as shown. Pivoted on a stud 8 in the recess 6 is a pawl 9 the inner end of which extends through the inner end of the recess 6 and is adapted to engage the teeth of the ratchet gear 1 whereby when the sleeve 3 is revolved in one direction the movement thereof will be imparted to the ratchet gear and through the latter to the shaft of the engine. The pawl 9 is provided with an outwardly projecting stem 10 having on its outer end a weight 11 which causes the pawl 9 to automatically engage the teeth of the ratchet gear when the parts are in an operative position as clearly shown in Fig. 7 of the drawings.

When the clutch member or sleeve 3 is in a retracted and inoperative position the pawl 9 is automatically disengaged from and held out of engagement with the teeth of the ratchet gear by a trip cam 12 comprising a segmental plate which is supported at a suitable position on the cross bar B by forwardly extending bolts 13 and has in its lower edge a cam recess 14 with which the weighted end of the lever is engaged when the sleeve 3 is retracted to an inoperative position thereby disengaging the pawl from the teeth of the ratchet gear 1 as clearly shown in Fig. 4 of the drawings.

The sleeve or clutch member 3 is provided with an operating mechanism comprising a chain 15 which is passed once around the sleeve and is secured thereto by a set screw 16. The ends of the chain extend longitudinally in opposite directions along the front side of the cross bar B and one end of the chain is connected with a short coiled spring 17 secured to the bar B as clearly shown in Fig. 3 of the drawings. The opposite end of the chain passes around a guide pulley 18 revolubly mounted on the outer side of the bar B near the opposite end thereof from the spring 17. After engaging the pulley the chain passes through an aperture in the cross bar B and extends back below the forward end of the automobile and is connected at its inner end to a substantially cylindrical block or head 19 which is pivoted on a bearing bracket 20 secured to the frame of the machine below the bottom thereof and immediately in rear of the dashboard as shown. The block or head 19 has formed thereon a foot lever 21 which projects upwardly through a slot 22 formed in the bottom of the vehicle as clearly shown in Figs. 1 and 2 of the drawings. Secured to the dashboard in front of the foot lever 21 is a lever retracting spring 23 with which the foot lever 21 is engaged when projected in a forward direction and which restores the lever to its normal position after being released from the foot of the operator.

By constructing and arranging my improved cranking mechanism as herein shown and described it will be seen that when it is desired to crank or start the engine, it is simply necessary for the person occupying the operator's seat to forcibly operate the foot lever 21 in the direction shown in dotted lines in Fig. 2 of the drawing, thereby retracting the chain 15 which, by its engagement with the sleeve or clutch member 3 tends to revolve the latter on the hub of the ratchet gear 1. As soon as the rotary movement of the sleeve begins the weighted end of the pawl 9 will be disengaged from the trip cam 12 and the pawl thereby brought into engagement with the teeth of the ratchet gear, whereupon the latter and the shaft of the engine will be revolved by the chain with the sleeve 3 as will be readily understood. This forcible starting of the shaft will impart sufficient momentum to the fly wheel W to carry the engine shaft around a sufficient number of times to start the firing mechanism of the engine.

As soon as the foot lever has been actuated in the manner described and the sleeve and gear turned to the full capacity of the chain a slightly greater distance than that shown in Fig. 7, the foot lever may be momentarily released whereupon the weight 11 will immediately retract the pawl 9 from engagement with the ratchet wheel, thus allowing the spring 17 to pull the chain 15 in the opposite direction which will reverse the movement of the sleeve on the hub of the gear 1. During the latter part of this reversing movement of the sleeve the pawl 9 will play loosely over the teeth of the ratchet gear until the weighted end of the pawl is brought into engagement with the cam lug whereupon the pawl will be immediately disengaged from the ratchet gear 1 and will be held out of engagement therewith until the sleeve is again operated in the manner described.

By normally disengaging the pawl from the teeth of the ratchet gear and holding the pawl in an inoperative position in the manner described, and by constructing the device in such a manner as to automatically release said pawl at the end of each working stroke of the crank mechanism, it will be seen that should the engine back fire the reverse movement of the ratchet gear will not be interfered with by the pawl, thus obviating any danger of injury to the parts by the operation of the engine in a reverse direction. It will also be seen that by arranging the parts of my improved cranking mechanism as herein shown and described that they will not in any way interfere with the starting of the engine by the usual cranking mechanism.

Having thus described my invention, what I claim is:

1. The combination with the shaft of a motor, of a ratchet wheel rotatable therewith, a drum revolubly mounted upon said shaft and having a ring surrounding the teeth of said ratchet wheel, said ring having an opening disposed tangentially to its periphery, a pawl pivoted in said opening and adapted to engage the teeth of said ratchet wheel, an arm projecting outwardly from said pawl beyond the periphery of said ring, a weight on the free end of said arm, whereby said pawl is retracted from engagement with the ratchet teeth when said ring is turned in one direction, a cam disposed in the path of said weight and adapted to retract said pawl when turned in the opposite direction, and means whereby said drum and ring may be rotated.

2. The combination with an engine shaft, a ratchet wheel rotatable therewith and having a hub, a sleeve or drum revolubly mounted upon said hub, a flange formed integrally with said drum and constituting a ring encircling the teeth of said ratchet wheel, said ring having an opening disposed tangentially to its periphery, a pawl pivoted in said opening, an arm extending outwardly from said pawl and terminating a distance from the periphery of said ring, a weight on the free end of said arm, whereby said pawl may be released from engagement with the ratchet wheel when said ring is turned a predetermined distance in one direction, a cam disposed in the path of said weight and adapted to retract said pawl from engagement with said ratchet wheel when turned a predetermined distance in the opposite direction, and means whereby said drum may be rotated.

In testimony whereof I have hereunto set my hand in presence of two subscribing witnesses.

HOMER C. STITT.

Witnesses:
E. J. KELLEY,
DITMER GROOMER.